United States Patent [19]
Collette et al.

[11] Patent Number: 5,976,696
[45] Date of Patent: Nov. 2, 1999

[54] SHELL/CORE PARTICULATES OF SUPERABSORBENT POLYMERS

[75] Inventors: Christian Collette; Manuel Hidalgo, both of Paris; André Kowalik, Gouvieux; Emmanuel Puchois, Paris, all of France

[73] Assignee: Elf Atochem, S.A., Puteaux, France

[21] Appl. No.: 08/796,730

[22] Filed: Feb. 7, 1997

[30] Foreign Application Priority Data

Feb. 7, 1996 [FR] France ................................. 96-01502

[51] Int. Cl.⁶ .................................................. B32B 5/16
[52] U.S. Cl. .......................................... 428/407; 525/344
[58] Field of Search ............................. 428/407; 525/344

[56] References Cited

U.S. PATENT DOCUMENTS

| | | | |
|---|---|---|---|
| 4,381,782 | 5/1983 | Mazurak et al. | 604/368 |
| 4,914,066 | 4/1990 | Woodrum | 502/62 |
| 4,970,267 | 11/1990 | Bailey et al. | 525/344 |
| 5,147,343 | 9/1992 | Kellenberger | 604/368 |
| 5,350,799 | 9/1994 | Woodrum et al. | 525/54.2 |
| 5,472,761 | 12/1995 | Goldberg et al. | 428/76 |
| 5,539,019 | 7/1996 | Suskind et al. | 523/201 |
| 5,549,590 | 8/1996 | Suskind et al. | 604/368 |
| 5,633,316 | 5/1997 | Gartner et al. | 525/54.32 |
| 5,669,894 | 9/1997 | Goldman et al. | 605/368 |

*Primary Examiner*—Hoa T. Le
*Attorney, Agent, or Firm*—Burns, Doane, Swecker & Mathis, L.L.P.

[57] ABSTRACT

Shell/core distortion-resistant particulates of a partially crosslinked superabsorbent polymer, the gradient of partial crosslinking of which being to such extent that the shells are harder and less flexible than the cores thereof, have a capacity to absorb 0.9% saline water of at least 50 g/g and the modulus of which is at least 35,000 Pa; a bed of a saline water gel of the subject particulates has a saline water absorption of at least 20 g/g and a porosity of at least 500 g.

18 Claims, 1 Drawing Sheet

SHELL/CORE PARTICULATES OF SUPERABSORBENT POLYMERS

BACKGROUND OF THE INVENTION

1. Technical Field of the Invention

The present invention relates to particulates of polymer resins having a high absorption capacity for water and for aqueous fluids (superabsorbents or, hereinafter, simply "SAP").

2. Description of the Prior Art

The porosity properties of the gels which result from the absorption of aqueous fluids by the superabsorbents and their mechanical moduli are of primary concern to this art. One of the principal uses of the superabsorbents is for the production of articles of hygiene, in which the absorbent function is chiefly provided by beds or sheets of individual particles or of agglomerates of such particles. The absorbency performance of the absorbent layer depends not only on the intrinsic absorptivity of the superabsorbent resin and the initial porosity of the particle beds, but also on their resistance to the blocking which occurs in use because of the loss of their absorptivity under load and because of the reduction in porosity under the influence of the pressure, or resulting from the swelling of the powder. Thus, the advantage of superabsorbents can be foreseen in which the gel particles would have an elastic modulus sufficiently high to impart thereto a sufficient resistance to distortion. Conventional superabsorbent resins are very unsatisfactory from this standpoint.

The principles of measurement of these various properties follow immediately hereafter, since it is indeed also through the observation and the comparison of their results that a quality judgment is rendered with regard to the available products and that the disadvantages are apparent which require a novel technical solution.

The particle size of the particles of superabsorbent polymer is measured on dry powder by screening.

The intrinsic capacity of the superabsorbent resin is provided by the so-called "tea-bag" test (measurement of the absorptivity and of retentivity by the "tea-bag" method, EDANA, European Association of the Nonwovens, measurement of the absorptivity and retentivity by the "tea-bag" method), by which test the water uptake is measured by weight in relation to the weight of a dry resin enclosed in a heat-sealable paper sachet, after immersion for about twenty minutes in an aqueous solution containing 0.9% of sodium chloride and draining for about ten minutes. It is expressed in g of solution containing 0.9% of NaCl in water, per g of dry SAP.

The measurement of the porosity of a bed of swollen gel is carried out in the apparatus shown in the Figure of Drawing. To accomplish this, 4 g of superabsorbent resin are swollen with 35 g of an aqueous solution of sodium chloride at a concentration of 0.9% by weight. The gel formed (G) is placed in a container (C) 52 mm in diameter and 55 mm in height. The container is next connected to the line of the reservoir (R) containing the saline solution (0.9% NaCl), optionally colored, and the quantity of solution which manages to pass through the gel is collected on a balance (B) and weighed continuously. The pressure of the liquid passing through the bed (2.5 kPa) is maintained constant by controlling the level of the feed reservoir. The mass of solution collected over 10 minutes is considered to be a measurement of the porosity of the gel.

The measurement of absorption under load of a thick bed of gel (namely, on the order of one centimeter) is an alternative form of the measurement of absorption on a thin bed (0.5 cm at the maximum), which is known to this art by the term AUL (absorption under load), and which is performed employing a device (described as apparatus for measuring the capillary suction capacity under pressure SC, in EP-Al-0258120), in which a sintered glass is placed level with and in a tank of water containing salt at a concentration of 0.9 g, on which sinter is placed a cylinder closed at its base by a sheet of nonwoven; the cylinder is filled with 0.5 g of SAP; the SAP is loaded with a weight in order to interfere with its liquid uptake. The level of the liquid is maintained constant at the height of the point of contact between the resin and the liquid. The weight and the surface of the cylinder containing the resin are selected such as to exert a pressure on the superabsorbent of 5 kPa. In the device employed in the examples given below, the weight employed was 1 kg and the diameter of the cylinder containing the superabsorbent was 5 cm, but the cylinder was charged with 1.5 g of superabsorbent powder, which is a suitable amount for the gel to have a significant thickness. The increase in the thickness of the bed of gel is a considerable obstacle to the overall swelling of the resin; conventional superabsorbents do not respond properly to this test. Thus, the absorption under load is measured in g of solution containing 0.9% of NaCl in water per g of dry SAP.

Measurement of the Mechanical Modulus

To carry out this measurement, an individual spherical particle of superabsorbent resin swollen to equilibrium with an aqueous solution of sodium chloride at a concentration of 0.9% (by weight) is placed at the bottom of a transparent cell and is subjected to a compressive stress applied by a movable piston, the movement of which is measured. The operation is carried out in a transparent cell in a bath of oil to prevent any loss of liquid from the particle by evaporation. A Hertz modulus K is determined by observing the change in the deformed lengthwise diameter of the particle under the effect of the force applied to the piston, in practice the change in the distance between the piston in contact with the particle and the base of the cell, and the force F applied to the piston, according to the formula $F(X)=5/2K\ R_0^{1/2}[R_0-X/2]^{3/2}$, where $F(X)$ is the force applied to the piston, X the deformed lengthwise radius of the sphere and $R_0$ the initial radius (before compression) of the swollen spherical particle.

When the superabsorbent powder comprises clusters of agglomerates, the procedure is also carried out on individual beads which always exist free in such powders.

Products exhibiting a sufficient saline absorption are accessible, with more or less acceptable absorptions under load, but they are very insufficient in respect of the porosity per the present invention, namely, porosity of the swollen bed. Thus, serious need continues to exist in this art for superabsorbents exhibiting porosities of at least 500, and preferably of at least 1,000 g.

SUMMARY OF THE INVENTION

Accordingly, a major object of the present invention is the provision of partially crosslinked superabsorbent polymers which are in the form of a powder:

(i) whose absorptivity for saline water is at least 50 g/g, (ii) a bed of gel of 1.5 g of which has a saline solution absorption of at least 20 g/g, under 5 kPa load, and (iii) whose bed of gel has a porosity of at least 500 g.

Figure 1:
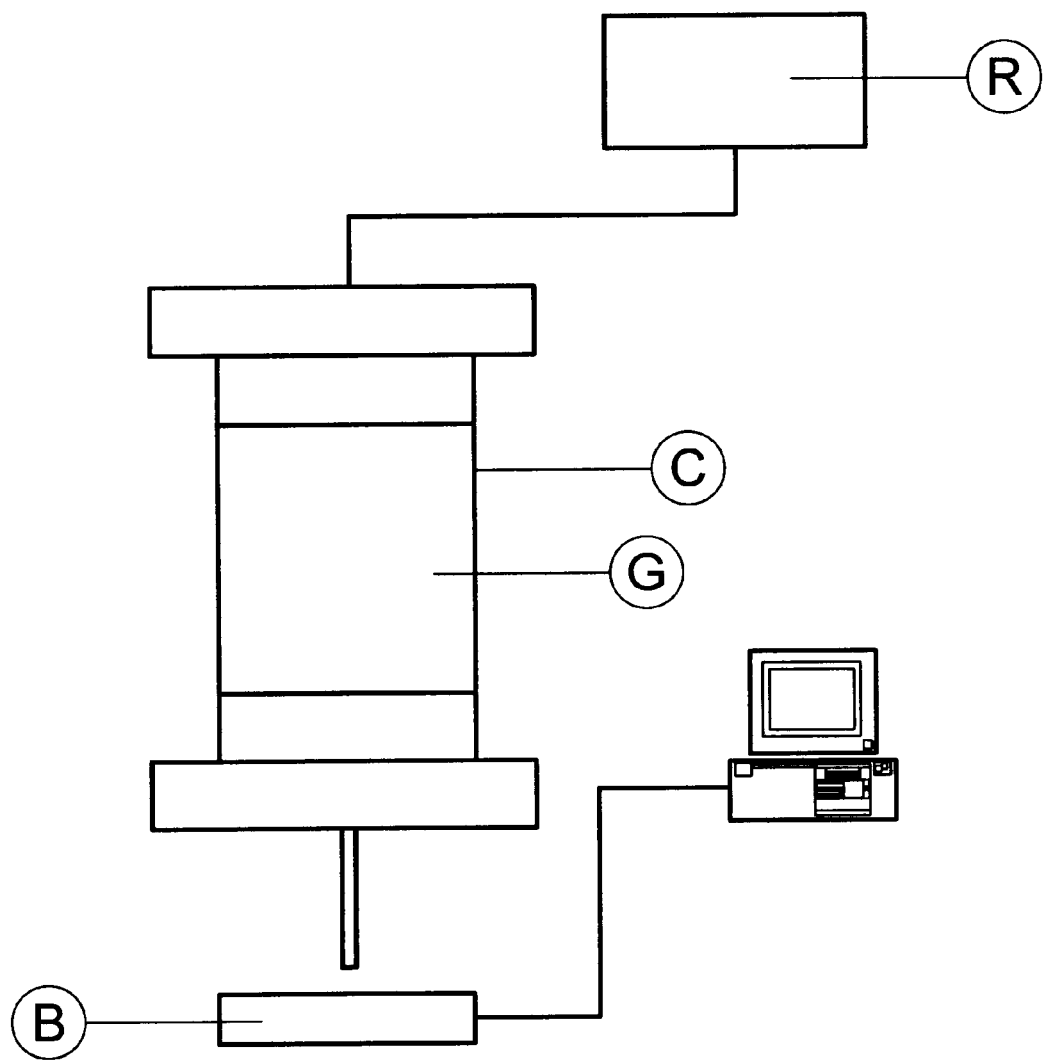
FIG. 1 is an apparatus for measurement of the porosity of the gel of the shell/core particulates according to the invention.

DETAILED DESCRIPTION OF BEST MODE AND SPECIFIC/PREFERRED EMBODIMENTS OF THE INVENTION

More particularly according to the present invention, the superabsorbent polymers are preferably polyacrylic superabsorbent resins, namely, those which are produced via polymerization of acrylic acid or of methacrylic acid or salts thereof. However, this invention is not limited thereto, and includes resins obtained from other hydrophilic monomers such as acrylamide, vinylsulfonic acid and its salts, acrylamidomethylpropanesulfonic acid and its salts, N-vinylpyrrolidone and styrenesulfonic acid and its salts.

The particle size of the SAPs of the invention can vary over wide limits, for example from 30 to 1,500 μm. However, preferred are SAPs in which 90% by weight of the particles range in size from 100 to 800 μm. It is also preferred that the amount of fines should be reduced as much as possible. The SAPs of the invention advantageously have an undersize fraction (fines) at 100 μm which is less than 1%.

The powders of the invention have a shell/core structure, the interior of the particle being more or less flexible and the exterior sheath or shell being harder than the core.

The absorption of saline water thereby preferably ranges from 50 to 57 g/g.

The modulus of such particulates is advantageously higher than 35,000 Pa and preferably ranges from 35,000 to 60,000 Pa.

The present invention also features a process for the preparation of the subject SAPS. It consists essentially of controlling the crosslinking of already polymerized SAP particles, a phenomenon designated "post-crosslinking" in the text which follows.

According to the process of the invention, a very strict control of the water content of the polymer is ensured at the beginning of the post-crosslinking stage. The controlling parameter of the subject process is the ratio of water to anhydrous superabsorbent (RWAS) at this time. In the present invention, this RWAS factor must range from 0.30 to 0.50. In the cases in which the measurement of a modulus is practicable, it has been verified that there is a good correlation between this modulus and the porosity, and that this modulus is a valuable experimental indicator, at least insofar as the superabsorbent powders comprising such spherical particles are concerned. Moduli equal to or higher than 35,000 Pa characterize the preferred final products.

The invention thus features a post-crosslinking by means of an aqueous solution of the crosslinking agent, of a powder of superabsorbent polymer in dispersion in a solvent whose water content has been characteristically adjusted to a value of 0.30 to 0.50, expressed as weight of water relative to the weight of the anhydrous superabsorbent polymer. The introduction of the crosslinking agent is carried out with stirring at a temperature of approximately 60°–75° C. The operation is more fully described hereinbelow as Sequence (g), between Sequences (f) and (h).

The post-crosslinking according to the invention can be applied to dry powders of previously prepared polymers, without restriction regarding the process by which they were obtained. However, it is particularly advantageous to incorporate the post-crosslinking into the processes for synthesis of superabsorbent polymers which are prepared by polymerization in inverse suspension, as, for example, described in EP-441,507 (Sumitomo Seika Chem Co.) or EP-742,231 (Elf Atochem S.A.) and to incorporate the post-crosslinking into a sequence with the stage of polymerization in inverse suspension or, if it exists, the stage of agglomeration of the individual particles in suspension.

The crosslinking agents which are suitable according to the present invention are preferably diol diglycidyl ethers. Ethylene glycol diglycidyl ether is the more preferred. The amounts to be employed are at least 500 ppm relative to the mass of the polymer treated (or, if desired, in the case where the post-polymerization is an operation which is incorporated into the complete process for obtaining the superabsorbent, relative to the amount of hydrophilic monomer employed, inter alia acrylic acid).

The solvent is advantageously a hydrocarbon which has a boiling temperature such that said solvent exhibits properties of azeotropic entrainment of water, for example a petroleum solvent cut. Heptane is preferred.

It should be appreciated that when the final superabsorbent is a powder comprising agglomerates of particles, the post-crosslinking may be carried out either before the agglomeration or after. However, this second embodiment is the preferred, as post-crosslinking can compromise the subsequent agglomeration.

In a preferred embodiment of the invention, the subject process comprises polymerization in inverse suspension, with agglomeration of the individual particles, including:

(1) a Sequence (a) of preparation of the dispersive medium;

(2) a Sequence (b) of preparation of the first solution of monomers;

(3) a Sequence (c) of introduction and of dispersion of the monomer in the dispersive medium, and its polymerization;

(4) a Sequence (d) of preparation of a second solution of monomer, designated the agglomerating solution;

(5) a Sequence (e) of introduction of agglomerating solution into the dispersive medium wherein a first population of polymerized individual particles already exist in suspension, and its polymerization;

(6) a Sequence (f) of removal of water from the agglomerates in suspension by azeotropic entrainment, with recirculation of the hydrocarbon fluid;

(7) a Sequence (g) of addition of the crosslinking agent in order to form the shell; and (8) a (final) Sequence (h) of evaporation of the remaining water and of the hydrocarbon fluid, and recovery of the powder obtained.

In order to further illustrate the present invention and the advantages thereof, the following specific examples are given, it being understood that same are intended only as illustrative and in nowise limitative.

The examples which follow are presented as examples and comparative examples of preparations of superabsorbents. The absorption properties of these various products are reported and discussed hereinbelow.

EXAMPLE 1

Preparation of Agglomerates of Particles of Core/Shell Structure having a Core with a Crosslinking Gradient Sequence (a)

258 g of heptane were introduced into a one-liter reactor fitted with a device for introducing solid or liquid reactants, a system for condensing vapor and for phase-separating condensates with a possibility of recirculation, a bladed stirrer, a system for purging with inert gas, a temperature probe and a heating/cooling device comprising a jacket in which flows a heat transfer fluid whose temperature can be adjusted to a set temperature, and 1.06 g of polyethylene modified with maleic anhydride (Hi-Wax 1105 A marketed by Mitsui Petrochemical Industries Co.) and 0.52 g of sucrose di/tristearate were introduced at about 80° C. with stirring at 400 revolutions/minute and with nitrogen purging. The solution was maintained at 80° C. for the period of time necessary for the ingredients to dissolve completely, after which it was cooled to 70° C.

Sequence (b)

86 g of an aqueous solution containing 80% by weight of acrylic acid and 127.10 g of 22.62% soda lye were introduced into another one-liter reactor similar to the preceding one, the operation being carried out sufficiently slowly not to exceed 30° C. 2 g of carboxymethyl cellulose were added to this solution, followed by 0.130 g of a solution containing 2% by weight of ethylene glycol diglycidyl ether, and 3.017 g of an aqueous solution containing 2% of potassium persulfate.

Sequence (c)

While the reactor with the heptane-based solution was maintained stirred at 400 revolutions/minute and under nitrogen purging, the aqueous phase prepared above was introduced rapidly therein and formed an inverse suspension in heptane. The introduction of the aqueous phase into the reactor caused a momentary drop in the temperature of the mixture, which was rapidly compensated by heat exchange with the jacket in which the heat transfer fluid was at the temperature of 70° C. Polymerization was carried out; its exothermicity could heat the mixture momentarily to a higher temperature, which the same mechanism cooled to the set temperature of 70° C. A suspension of polymer, maintained at this temperature, was formed.

Sequence (d)

While the preceding sequence was ongoing, a neutralization of 86 g of aqueous solution containing 80% by weight of acrylic acid was carried out with 127.10 g of 22.62% soda lye in a reactor equipped like that of Sequence (a), the procedure being sufficiently slow not to exceed the temperature of 30° C. To this solution of partially neutralized (75 mol %) acrylic acid were added 2 g of carboxymethyl cellulose and 0.46 g of an aqueous solution containing 10% of nonylphenol ethoxylated with 50 moles of ethylene oxide (Remcopal 31250 marketed by Ceca S.A.) and then 3 grams of an aqueous solution containing 2% by weight of potassium persulfate and 1.5 grams of an aqueous solution containing 2% of ethylene glycol diglycidyl ether.

Sequence (e)

The monomer charge prepared in Sequence (d) above was introduced dropwise into the reactor, as is, upon completion of Sequence (c). This introduction was for approximately 30 minutes. Purging with nitrogen was maintained and the stirring speed was maintained in the range of 400–600 revolutions/minute. The temperature in the reactor tended to oscillate as a result of the introduction of the cold charge and then of the exothemicity of the polymerization reaction. Care was taken that these oscillations did not exceed the range 63°–73° C. In general, the set point of the temperature of the heat transfer fluid in the jacket sufficed to dampen these movements. When the charge had been completely introduced, the stirring rate was increased to 800 revolutions/minute and the reactor was maintained under these conditions for about twenty minutes. The exothermicity of the polymerization can momentarily increase the temperature of the reactor, which returned naturally to the temperature of the heat transfer fluid in the jacket.

Sequence (f)

When the polymerization of the second charge was complete, the jacket temperature was increased to 120° C. to distil the heptane/water mixture, the device recycling the heptane phase into the reactor and retaining the separated water visible in the separator. The operation was continued as long as necessary for the RWAS of the polymer contained in the reactor to attain the value of 0.40.

Sequence (g)

When the value of RWAS of 0.40 was attained, the distillation was terminated by returning the heat transfer fluid to a set value of 60°–75° C. When heat equilibrium was established in the reactor, 7.75 g of a solution containing 2% by weight of ethylene glycol diglycidyl ether was introduced.

Sequence (h)

The set temperature was increased to 115°–130° C. to remove the water and heptane. After complete evaporation, a superabsorbent polymer was obtained in the form of a powder comprising agglomerates of beads, the undersize of which on a 100 micron screen was less than 1%. Its saline water absorption was 55 g/g of polymer.

EXAMPLE 2

Poorly Formed Shell via Fixing the RWAS at an Improper Level

The procedure of this example was identical to that of Example 1, except for the Sequence (f) which was conducted so that the RWAS was 0.2.

The powder obtained had a 100-micron undersize less than 1%. Its saline water absorption was 55 g/g.

EXAMPLE 3

Comparative Example of a Homogeneous Crosslinking; Absence of "Core/Shell" Structure The procedure of this example was identical to that of Example 1, except:

(a) Sequence (b): 1.09 g of a solution containing 2% by weight of ethylene glycol diglycidyl ether, (b) Sequence (d): 1.09 grams of an aqueous solution containing 2% of ethylene glycol diglycidyl ether, (c) Sequence (f): RWAS=0.2, (d) Sequence (g): no "shell crosslinking agent."

The powder obtained had a 100-micron undersize smaller than 1%. Its saline water absorption was 55 g/g.

EXAMPLE 4

Example of Nonagglomerated Individual Spherical Particles, but with "Core/Shell" Structure The procedure of this example was identical to that of Example 1, except:

(a) Sequence (b): 0.39 g of a solution containing 2% by weight of ethylene glycol diglycidyl ether, (b) no Sequence (d) or Sequence (e): the sequence continued directly with Sequence (f), the temperature of the reactor being again increased to 120° C. as soon as the polymerization was completed.

The powder obtained had a 100-micron undersize smaller than 30%. Its saline water absorption was 55 g/g.

EXAMPLE 5

The procedure of Example 1 was repeated, except:
(a) Sequence (b): 1.09 g of a solution containing 2% by weight of ethylene glycol diglycidyl ether,
(b) Sequence (f): RWAS=0.3,
(c) Sequence (g): 1.5 g of a solution containing 2% by weight of ethylene glycol diglycidyl ether.

The powder obtained had a 100-micron undersize smaller than 1%. Its saline water absorption was 57 g/g.

SUMMARY OF EXAMPLES 1 TO 5

The mechanical properties (moduli in Pa), porosity (grams of fluid collected in 10 minutes), absorption under load in a thick bed in g/g, RWAS values and the post-crosslinking agent contents employed are reported in the Table below.

TABLE

|  | Ex. 1 | Ex. 2 | Ex. 3 | Ex. 4 | Ex. 5 |
|---|---|---|---|---|---|
| Powder type | Aggl. | Aggl. | Aggl. | Aggl. | Aggl. |
| Saline absorption | 55 | 55 | 55 | 55 | 57 |
| Undersize at 100 μm | <1% | <1% | <1% | <30% | <1% |
| Modulus (Pa) | 55,000 | 25,000 | 15,000 | 45,000 | 25,000 |
| Porosity | 1000 | 50 | 5 | 500 | 50 |
| Absorption under load | 24 | 15 | 5 | 20 | 20 |
| RWAS | 0.40 | 0.20 | 0.20 | 0.40 | 0.3 |
| Crosslinking agent (ppm) | 720 | 720 | 720 | 720 | 360 |

The product of Example 1 was an agglomerated superabsorbent typical of the invention.

The product of Example 2 was the result of a post-treatment at RWAS lower than the critical value. It is interpreted as being a superabsorbent having a poorly formed shell despite the high content of crosslinking agent. Its properties were intermediate or mediocre.

The product of Example 3 had not been subjected to post-crosslinking. Its properties were obviously poor.

The product of Example 4 was a powder of nonagglomerated spherical particles post-crosslinked according to the invention. Its properties were good.

The product of Example 5 comprised agglomerates of particles whose shells were apparently not thick enough.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Shell/core distortion-resistant particulates of a partially crosslinked superabsorbent polymer, the gradient of partial crosslinking of which being to such extent that the shells are harder and less flexible than the cores thereof, having a capacity to absorb 0.9% saline water of at least 50 g/g and the modulus of which being at least 35,000 Pa.

2. The shell/core particulates as defined by claim 1, having a particle size ranging from 30 to 1,500 μm.

3. The shell/core particulates as defined by claim 2, 90% by weight thereof having a particle size ranging from 100 to 800 μm.

4. The shell/core particulates as defined by claim 3, less than 1% by weight thereof having a particle size of 100 μm or less.

5. The shell/core particulates as defined by claim 1, wherein a bed of gel of 1.5 g of said shell/core particulates has a saline water absorption of at least 20 g/g under 5 kPa pressure.

6. The shell/core particulates as defined by claim 1, wherein a bed of gel of 1.5 g of said shell/core particulates has a porosity of at least 500 g.

7. The shell/core particulates as defined by claim 6, having a capacity to absorb 0.9% saline water ranging from 50 to 57 g/g.

8. The shell/core particulates as defined by claim 7, the modulus of which ranging from 35,000 to 60,000 Pa.

9. The shell/core particulates as defined by claim 1, wherein a bed of gel of 1.5 g of said shell/core particulates has a porosity of at least 1,000 g.

10. The shell/core particulates as defined by claim 1, essentially spherical in shape.

11. The shell/core particulates as defined by claim 1, comprising agglomerates thereof.

12. The shell/core particulates as defined by claim 1, comprising a superabsorbent (meth)acrylic polymer or salt thereof.

13. The shell/core particulates as defined by claim 1, comprising a superabsorbent acrylamide, vinylsulfonic acid, acrylamidomethylpropanesulfonic acid, N-vinylpyrrolidone or styrenesulfonic acid polymer or salt thereof.

14. An aqueous gel of the shell/core particulates as defined by claim 1.

15. A process for the preparation of the shell/core particulates as defined by claim 1, comprising partially post-crosslinking a suspension of water-swollen particles of said superabsorbent polymer in a hydrocarbon medium to such extent as to establish a shell/core hard/flexible crosslinking gradient therethrough, wherein said water swollen particles have a water content of 0.30 to 0.50, expressed as weight of water relative to the weight of said superabsorbent polymer.

16. The process as defined by claim 15, comprising partially post-crosslinking with an aqueous solution of a diol diglycidyl ether.

17. The process as defined by claim 15, comprising partially post-crosslinking with ethylene glycol diglycidyl ether.

18. The process as defined by claim 15, comprising partially post-crosslinking an inverse suspension, in heptane, of said particles of said superabsorbent polymer.

* * * * *